W. R. BEETLESTONE.
COOKING APPARATUS.
APPLICATION FILED JUNE 29, 1916.

1,196,644.

Patented Aug. 29, 1916.

UNITED STATES PATENT OFFICE.

WILLIAM ROBERT BEETLESTONE, OF URMSTON, ENGLAND.

COOKING APPARATUS.

1,196,644. Specification of Letters Patent. Patented Aug. 29, 1916.

Application filed June 29, 1916. Serial No. 106,724.

*To all whom it may concern:*

Be it known that I, WILLIAM ROBERT BEETLESTONE, a subject of the King of Great Britain, residing at Urmston, in the county of Lancaster, in the Kingdom of England, have invented certain new and useful Improvements in Cooking Apparatus, of which the following is a specification.

This invention has for its object a culinary apparatus or utensil for cooking hams and other articles of food. The desiredatum in this kind of cooker where a number of hams or other articles of food are to be cooked one after another, is to be able to insert them as speedily as possible and when cooked and cooled to eject them from the cooker, with the gelatinized liquid thereon, without in any way mutilating the outside surface. This is effected according to my present invention by providing the cooker on the inside with a supplementary or false bottom, and by providing the fixed bottom of the cooker with a center hole through which a rod can be passed to push the false bottom out of the cooker and carry with it the cooked ham or other article of food, so that the rod itself does not come into contact with the food at all. The hole through which the rod is passed, may normally be closed by a cap, so as to retain in the cooker, any juices that may exude from the ham, &c.

Figure 1:
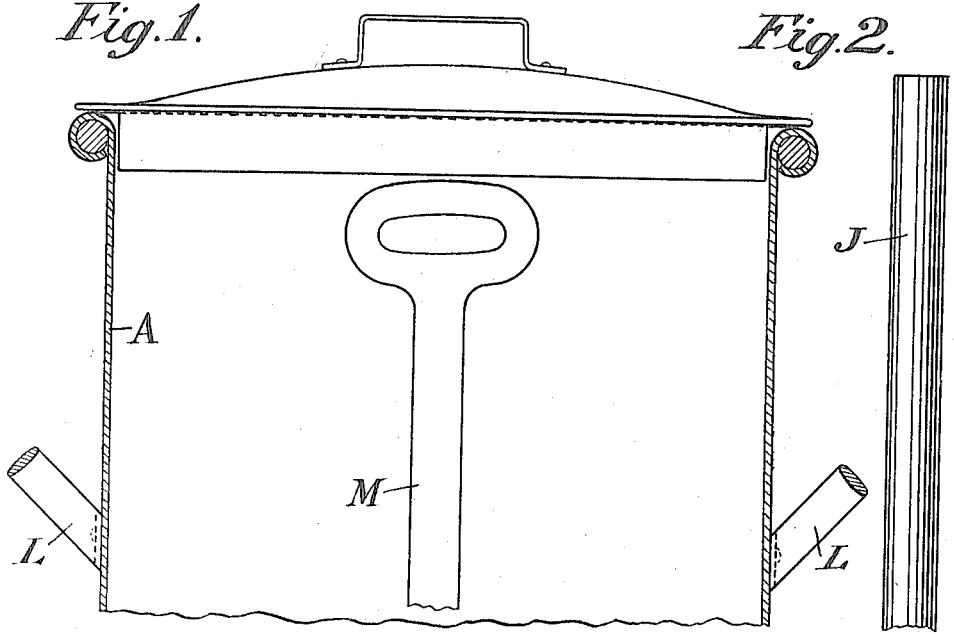
Figure 2:
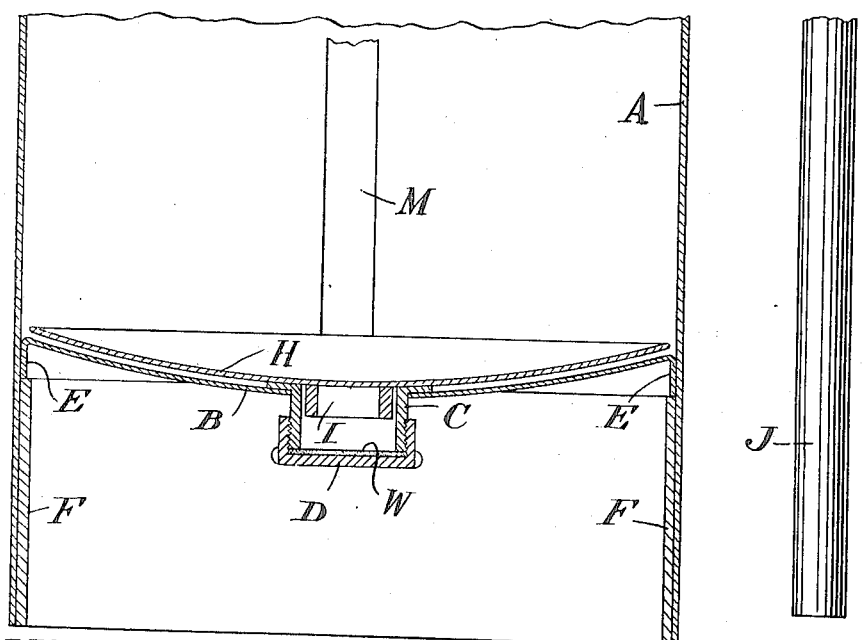

In the accompanying drawings—Figure 1 is a sectional elevation of my improved cooking apparatus or utensil; and Fig. 2 shows the ejecting rod.

In the drawing, A is a vessel or cook-pot of round, oval, square or other suitable shape in cross section and formed of a fixed bottom B and sides, the bottom being preferably one or two inches from the end, and slightly sloping or curving down from the sides to the center. This bottom B has at the center an orifice provided with a dependent flange C which flange is screw threaded on the outside to which a screw cap D can be applied, so that it can be screwed off and on by hand. This bottom is soldered or otherwise fixed to the sides A of the vessel by a dependent flange E, which again is held up or supported by a collar F also soldered or otherwise affixed to the sides so as to strengthen the bottom and make a thoroughly tight joint. The top edge of the vessel A is turned over against the outside of the vessel so as to form a bead.

Lying immediately on, or adjacent to the bottom B is a supplementary or false bottom H sloping down from the sides toward the center so as to be dish or saucer shape. This is substantially the same shape as the bottom B but instead of a center hole, it has a depending hollow projection I at the center on the underside which fits the center hole in the fixed bottom quite loosely. This hollow projection is preferably tubular so as to form an inverted cup to receive the end of the ejector rod J. The supplementary bottom H is a little smaller than the inside of the vessel A and is moveable therein.

The vessel or cook pot which is provided with a removable lid or cover, is furnished with a handle or handles such as L to enable the apparatus to be lifted and transported. The supplementary or false bottom H may have upstanding strips M affixed to it if desired to facilitate the said bottom being lifted out, these strips being located close to the walls of the vessel A on the inside. In screwing on the cap D, the use of a washer W of leather, rubber or the like is desirable, so as to make a liquid tight joint.

When a ham or other article is placed in the vessel so as to rest on the supplementary or false bottom H, and the screw cap is screwed on, the vessel is placed in the boiling water or in steam chamber or the like, until the cooking operation is completed. When the article to be cooked is not juicy or it is not desired to retain the juice, then the screw cap need not be screwed on before the cooking is commenced. When the article is sufficiently cooked, the vessel is lifted out, cooled, the screw cap removed, and the ejector rod J is pushed through the hole in the bottom, thus pushing up the supplementary or false bottom and ejecting the ham from the cooker. When the ham is withdrawn, the bottom H falls into position again, the cap D is again screwed on, and the apparatus is ready to receive another ham. The vessel A is preferably made with straight sides so that in the wholesale cooking of hams and other goods, a plurality of these vessels can be placed close together in an oven.

I declare that what I claim is:—

1. In a culinary apparatus for cooking hams or other articles of food, the combination of a vessel having a bottom and sides, a supplementary or false bottom supported inside the vessel, an orifice in the fixed bottom, a hollow projection on the underside of the supplementary or false bottom and adapted to loosely fit in the orifice and to receive a rod for pushing the said supplementary bottom out of the vessel and supporting it.

2. In a culinary apparatus for cooking hams or other articles of food, the combination with a vessel having a bottom and sides, a central orifice in the fixed bottom provided with a dependent flange screw threaded and to which is screwed a member for closing the same, a supplementary bottom supported on the fixed bottom, and a hollow projection on the underside of the supplementary bottom adapted to loosely fit the central orifice and adapted to receive a rod inserted through the orifice for pushing the supplementary bottom upwardly within the vessel and supporting it.

3. In a culinary apparatus for cooking hams or other articles of food, the combination of a vessel or pot having a bottom and sides, a supplementary or false bottom supported inside the vessel, an orifice in the fixed bottom through which an ejecting rod can be passed to eject the false bottom and with it the food, and means for closing the orifice during the cooking operation.

4. In a culinary apparatus for cooking hams or other articles of food, the combination of a vessel or pot having a bottom and sides, an orifice in the fixed bottom through which an ejecting rod can be passed, a supplementary or false bottom supported on the fixed bottom inside the vessel, and a hollow projection on the underside of the supplementary bottom adapted to loosely fit the orifice in the fixed bottom.

5. In a culinary apparatus for cooking hams or other articles of food, the combination with a vessel or pot having a bottom and sides, a collar fixed to the sides below the bottom upon which the said bottom rests, a central orifice in the fixed bottom provided with a dependent flange screw threaded on the outside to which a screwed cap is applied, a supplementary or false bottom supported on the fixed one, and a hollow projection on the underside of the supplementary one adapted to loosely fit the central orifice.

In witness whereof I have hereunto signed my name this 6th day of June 1916, in the presence of two subscribing witnesses.

WILLIAM ROBERT BEETLESTONE.

Witnesses:
JOSEPH EDWARD BLINCOE,
SIDNEY WILLIAMS DOD.

Copies of this patent may be obtained for five cents each, by addressing the "Commissioner of Patents, Washington, D. C."